United States Patent [19]

Sato et al.

[11] 4,318,276
[45] Mar. 9, 1982

[54] SELF-REGISTERING TEMPERATURE CONTROL DEVICE

[75] Inventors: Koji Sato; Osamu Koyatsu; Takumi Okitsu; Yoshio Harada; Yuji Yamamura, all of Tokyo, Japan

[73] Assignee: Kabushiki Kaisha Saginomiya Seisakusho, Tokyo, Japan

[21] Appl. No.: 118,906

[22] Filed: Feb. 6, 1980

[51] Int. Cl.³ .................... G02B 23/00; G05D 23/00
[52] U.S. Cl. .................................. 62/126; 73/343.5; 346/33 TP; 236/94
[58] Field of Search ............ 236/94; 165/11; 62/126; 346/33 TP; 73/343.5

[56] References Cited
U.S. PATENT DOCUMENTS

| | | | |
|---|---|---|---|
| 1,624,887 | 4/1927 | Bristol | 236/94 X |
| 1,690,517 | 11/1928 | Wilson et al. | 73/343.5 X |
| 2,376,573 | 5/1945 | Cockley | 236/94 X |
| 3,105,638 | 10/1963 | Leupold et al. | 346/25 X |
| 3,945,017 | 3/1976 | Watanabe et al. | 346/33 TP |
| 3,973,265 | 8/1976 | Andrews | 73/343.5 X |

*Primary Examiner*—William E. Wayner
*Attorney, Agent, or Firm*—Brumbaugh, Graves, Donohue & Raymond

[57] ABSTRACT

A self-registering temperature control device in which an electronic control section for controlling air temperature in a refrigerated container and an automatic temperature recording section are accommodated in a housing is provided. This structure permits easy survey of all the units concerned with temperature controlling and recording.

6 Claims, 5 Drawing Figures

SELF-REGISTERING TEMPERATURE CONTROL DEVICE

BACKGROUND OF THE INVENTION

The present invention relates to a self-registering temperature control device which maintains the temperature of a commodity at a desired level over a given period of time by supplying a controlled hot or cold atmosphere which is recorded automatically with accuracy.

It is often required to store a commodity in a preselected temperature for a given period of time. A typical example may be a refrigerated container which, when employed to transport food stuffs, must keep the foods at a controlled temperature during transportation to keep them fresh. Usually a refrigerated container is equipped with means for continuously recording the temperature inside the container so that there is recorded proof of the atmospheric temperature in which the food stuffs have been stored.

However, devices for controlling the atmospheric temperature in a refrigerated container and devices for recording the controlled temperature are separately equipped in the container. This arrangement makes it difficult to survey, at a glance, the record on the chart paper or proper function of the temperature control means, the motor operation and the motor battery voltage.

SUMMARY OF THE INVENTION

In order to overcome the shortcoming of the conventional arrangement of the temperature control means and the recording means, the present invention provides a self-registering temperature control device used for a refrigerating system comprising an open-top housing; a base plate provided within said housing; an electronic control section for controlling air temperature in a refrigerated chamber; and an automatic temperature recording section adapted to sense the controlled air temperature and record the temperature; said electronic control section and said automatic temperature recording section being mounted on said base plate.

DETAILED EXPLANATION OF THE PREFERRED EMBODIMENT

Figure 1:
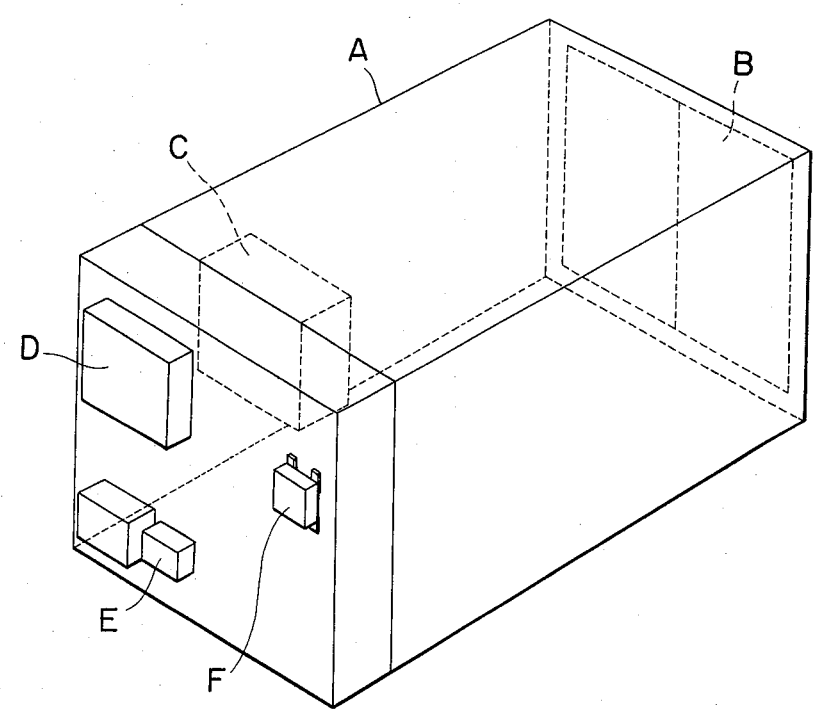
FIG. 1 is a perspective view of a refrigerated container to which a self-registering temperature control device according to the present invention is applicable.

A preferred embodiment of the present invention will hereinafter be described with reference to the accompanying drawings. FIG. 1 illustrates a refrigerated container to which a self-registering temperature control device according to the present invention is applicable. The container has a door or doors B at one internal end thereof and a cooler C with a fan in its interior. Mounted to the other external end of the container are a heat exchanger D, a motor-driven compressor E and a unit F for controlling and recording temperature according to the present invention inside the container.

Figure 2:
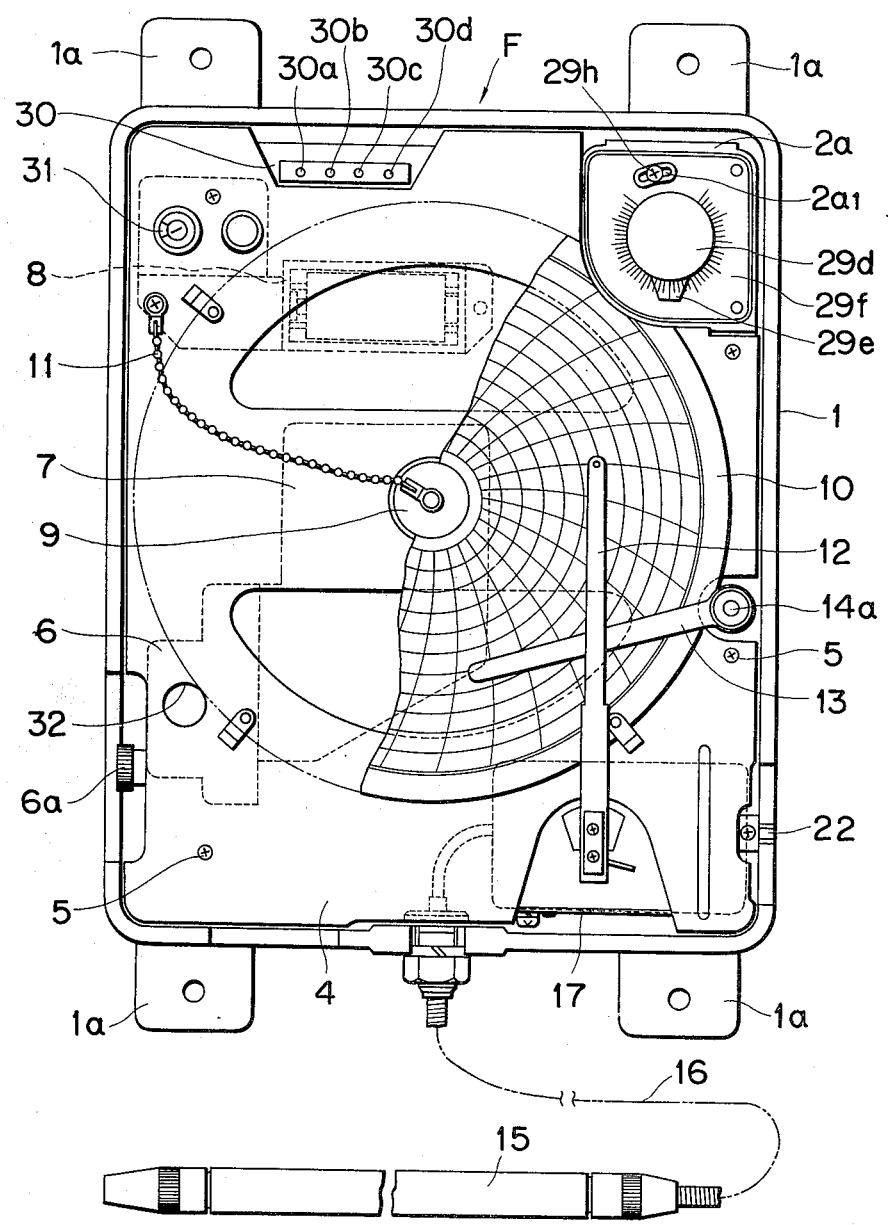
FIG. 2 is a plan view of one embodiment of the self-registering temperature control device according to the present invention.
Figure 3:
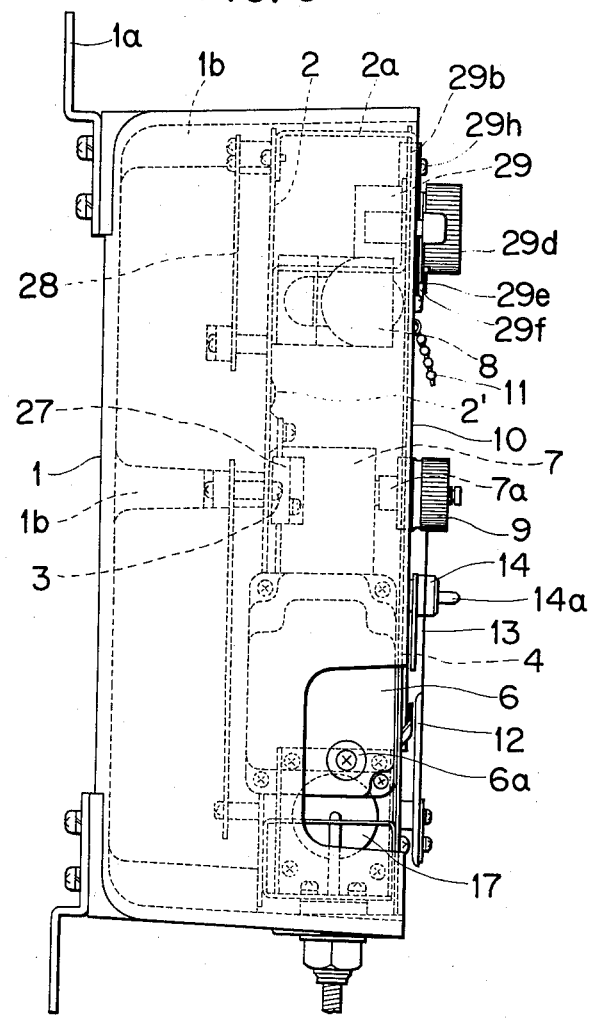
FIG. 3 is a side elevation of the device shown in FIG. 2.

Referring to FIGS. 2 and 3, the temperature controlling and recording unit F has a housing 1 provided with mounting legs 1a on its face. A base plate 2 is fastened by screws 3 to upright support portions 1b of the housing 1 which are positioned along the inner walls of the housing. A face plate 4 is securely mounted to suitable support members on the base plate 2 by screws 5.

The base plate 2 carries thereon a tuning fork motor 6, a gear reducer 7 operatively connected with the motor 6 and a battery 8. A rotary output shaft 7a of the gear reducer faces an aperture formed through a central portion of the face plate 4. A thumb piece 9 is screwed onto the outer end of the output shaft 7a so as to fix a pressure-sensitive recording sheet 10 in place therebetween through a central aperture of the sheet. A support chain 11 connects the thumb piece 9 to the face plate 4.

Figure 4:
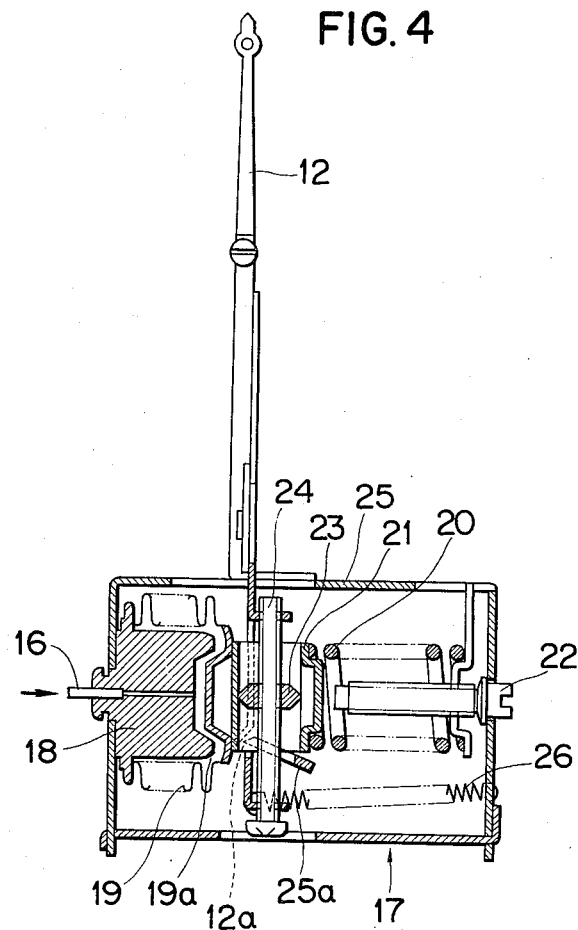
FIG. 4 is a sectional side view of the recording section of the device of FIG. 2

Referring to FIG. 4 along with FIGS. 2 and 3, the unit F accommodates in housing 1, an electronic control section and an automatic temperature control section. The temperature control section consists of an automatic thermograph in which a pen lever 12 has a ball-point nib at one end thereof and is operated by the pressure of a fluid which may be a gas or a liquid. A pen raising arm 13 for actuating the lever 12 is driven by a shaft 14 provided with a thumb piece 14a.

The reference numeral 15 denotes a generally cylindrical temperature sensor or probe in which a gas-adsorptive substance and a gas (or a liquid) are enveloped, said sensor being in the refrigerated container. A narrow flexible tube 16 provides communication of the gas in the probe 15 with a pen lever drive assembly 17. As shown in detail in FIG. 4, the drive assembly 17 includes a bellows 19 having one end rigidly and sealingly connected to a seat 18 to define a pressure chamber 19a therebetween. A passage extends axially throughout the bellows seat 18 with one end of the tube 16 received therein, thereby establishing fluid communication between the probe 15 and chamber 19a. Thus the other end of the bellows is movable axially in accordance with the fluid pressure admitted in the chamber 19a.

A coiled compression spring 20 is positioned in a casing 25 of the drive assembly 17 to mainly counteract a pressure developed in the chamber 19a. The spring 20 rests at one end on a suitable seat and at the other end on a generally U-shaped drive plate 21. The drive assembly also includes a recording temperature setting screw 22 which is manipulatable to adjust the force of the spring 20 thus setting a required temperature level accurately.

A threaded rod 24 for leverage adjustment extends throughout the interior of the drive plate 21 while carrying a member 23 rigidly therewith. A fulcrum plate 25a is securely mounted to the casing 25 to support the pen lever 12 at a fulcrum 12a without allowing engagement thereof with the drive plate 21. Part of the pen lever 12 is held in threaded engagement with the threaded rod 24. A tension spring 26 constantly biases the pen lever 12 counterclockwise about the fulcrum 12a and keeps the member 23 on the rod 24 in constant engagement with a left inner surface of the drive plate 21 as viewed in FIG. 4.

As previously stated the probe 15 has a gas-adsorptive substance and a gas encapsulated therein. The amount of gas retained in the adsorptive substance varies with ambient temperature causing the pressure to rise progressively with temperature. A desired relationship between the temperature and fluid pressure is obtainable by suitably selecting the gas-adsorptive substance and amount of gas enveloped in the probe. Furthermore, the probe is little affected by variations of ambient conditions in regions other than the temperature sensing area so that a sufficiently wide range of temperature is measurable and the temperature in the sensing area can be indicated with accuracy.

The biasing force of the compression spring 20 is adjusted through the screw 22 until the force of the spring 20 and that of the tension spring 26 are brought into equililibrium with the fluid pressure inside the bellows which corresponds to a preselected reference temperature. The pen lever 12 is maintained in a stationary neutral position under this condition. As the temperature around the probe 15 rises beyond the reference level to such an extent that the fluid pressure from the sensor is introduced in the chamber 19a to inflate the bellows and overcome the combined force of the springs 20 and 26, the pen lever 12 is moved clockwise in proportion to the variation of the temperature. A fall of the temperature beyond the reference level will in turn cause a counterclockwise movement of the pen lever 12.

An electronic control circuitry of the temperature control section includes a terminal plate 27 and a relay board 28, both having circuits printed thereon.

This electronic circuitry controls the atmospheric temperature in the refrigerated container to a predetermined level. However, even when the temperature reaches the predetermined level, the automatic thermograph records a temperature slightly higher than the level reached in the refrigerated container. This is caused by extra gas expansion within the housing, particularly in the bellows, since the temperature in the housing tends to be higher than in the refrigerated container. In order to make the thermograph record the predetermined temperature, the base plate 2 has an auxiliary electronic control circuit element 2' printed thereon. Said element 2' senses the extra temperature in the housing and lower the temperature in the refrigerated container until the temperature is also lowered in the housing such that the thermograph records the predetermined temperature. A rotary-type slide resistance box 29 is associated with the electronic control circuitry to set a desired temperature level.

Figure 5:
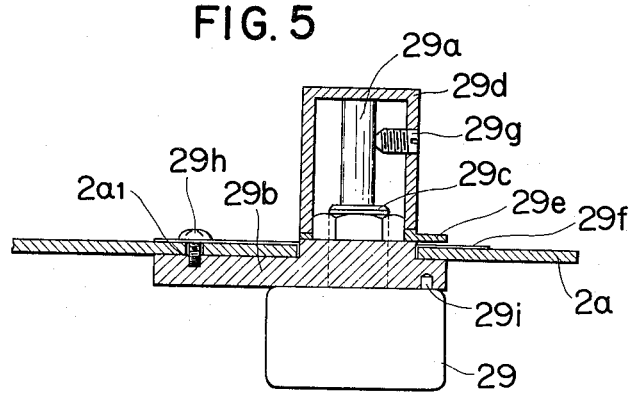
FIG. 5 is a vertical section of a control temperature setting assembly in the temperature control section.

As shown in detail in FIG. 5, the resistance box 29 has a shaft 29a rotatable to vary the resistance of a resistor contained in the box 29 and extending from the box through a bearing 29c secured to a holder 29b. A thumb piece 29d for setting temperature is rotatable integrally with the shaft 29a such that its associated indicator 29e moves over a scale plate 29f on a mounting plate 2a (see FIGS. 2 and 3). The integral rotation of the thumb piece 29d with the shaft 29a is ensured by a set screw 29g which hold them rigid with each other. Meanwhile, the mounting plate 2a is formed with an arcuate slot $2a_1$ through which a locking screw 29h extends into threaded engagement with the holder 29b. A lug 29i on the outer surface of the resistance box 29 is received in a recess formed in the holder 29b. With this arrangement, when the locking screw 29h is loosened and manipulated in either direction along the slot $2a_1$, the resistance box 29, holder 29b and thumb piece 29d will rotate integrally about the axis of the shaft 29a relative to the plate 2a while the holder 29b will slide on the plate 2a.

The thumb piece 29d connected with the resistance box 29 is rotated to a position where the indicator 29e aligns with one of the graduations on the scale plate 29f indicating a desired temperature level, e.g. 10° C. For example if after starting the device for work, an operator finds a thermometer in the refrigerated container indicating a temperature level different from the preselected one, e.g. 9° C., then the locking screw 29h will be loosened and moved along the slot $2a_1$ to bodily rotate the holder 29b, resistance box 29 and thumb piece 29d until the control device points the same temperature as that indicated by the thermometer. Thereafter the locking screw 29h will be tightened again to fix the assembly to the mounting plate. As will thus be understood, a temperature level which the control device indicates can be adjusted precisely to an actually measured temperature level without varying the resistance of the box 29.

Denoted by the reference numeral 30 is a display with multiple lamps responsive to operating conditions of the temperature control device. The display 30 in the illustrated embodiment has four lamps 30a, 30b, 30c and 30d representing "adequate temperature", "defrostation" and other conditions. Concurrently these lamps on the display 30 are so wired as to entirely turn off when a temperature sensor circuit included in the electronic circuitry is snapped or short-circuited.

The temperature control device is further provided with a voltmeter 31 connected with a battery for driving the motor 6, and a window 32 formed through the face plate 4 to permit observation of the motor rotation from outside the device.

Since all the components of the device discussed above are carried on the base plate 2, they can be taken out bodily from the housing 1 for inspection and repair merely by removing the face plate 4 and releasing the screws 3.

A self-registering temperature control device according to the present invention achieves the following various advantages. Setting and controlling temperature can be accurately performed with the aid of an electronic circuit possessing means for compensating a preset temperature level. The controlled temperature is recorded by a system using a gas or liquid pressure. Operating conditions of the temperature control device, rotation of a sheet driving motor and remaining voltage of a power source for driving the motor are displayed concentrically by, for example, lamps, a window and a voltmeter, respectively. This facilitates visual confirmation of the controlling and recording conditions which ensures proper functioning of the device over a long period of time. A record provided by the device faithfully indicates a long term temperature control. The controlling and recording functions are fulfilled by a combined single assembly so that not only such functions are exhibited in a collective manner but inspection and repair can be performed easily.

Moreover, the unitised packaging in which the temperature controlling section and the recording section are consolidated as an integral unit permits easy removement thereof from the container which is too old for further use.

What is claimed is:

1. A self-registering temperature control device used for a refrigerating system comprising:
    an open-top housing;

a base plate provided within said housing;
an electronic control section mounted on said base plate for controlling air temperature in a refrigerated chamber;
a face plate to cover the open-top housing;
  an automatic temperature recording section to sense and record the controlled air temperature, including a recording chart rotatably mounted on an outer surface of the face plate, a tuning fork motor carried by the base plate, a gear reducer carried by the base plate and operatively connected with the motor, a battery carried by the base plate for operating the motor, and means for connecting said chart and said gear reducer; and
  a voltmeter provided on the outer surface of the face plate and connected with said battery.

2. A self-registering temperature control device according to claim 1, wherein said automatic temperature recording section includes an automatic thermograph.

3. A self-registering temperature control device according to claim 2, wherein said automatic thermograph comprises a temperature sensor containing a fluid therein and provided in the refrigerated chamber; a flexible tube providing communication of the fluid into the housing; bellows provided hermetically in the housing to receive said fluid communication and adapted to inflate in response to fluid expansion due to temperature rise in the refrigerating chamber; means for counteracting, with a predetermined pressure, said bellow; a lever mounted within the housing to pivot in response to bellows inflation and carrying a nib at its tip; a chart paper provided in contacting relation to said nib; a drive motor to move said chart paper; and a source battery for the drive motor.

4. A self-registering temperature control device according to claim 1, wherein said face plate has a window formed therethrough to permit observation of the motor operation from outside the device.

5. A self-registering temperature control device according to claim 1 further including a display means for displaying operation of the temperature control device.

6. A self-registering temperature control device according to claim 5, wherein said display means includes a notch formed in the face plate and a plurality of lamps provided behind said notch to represent the controlled temperature.

* * * * *